April 25, 1939.  J. HANDLEY  2,155,655

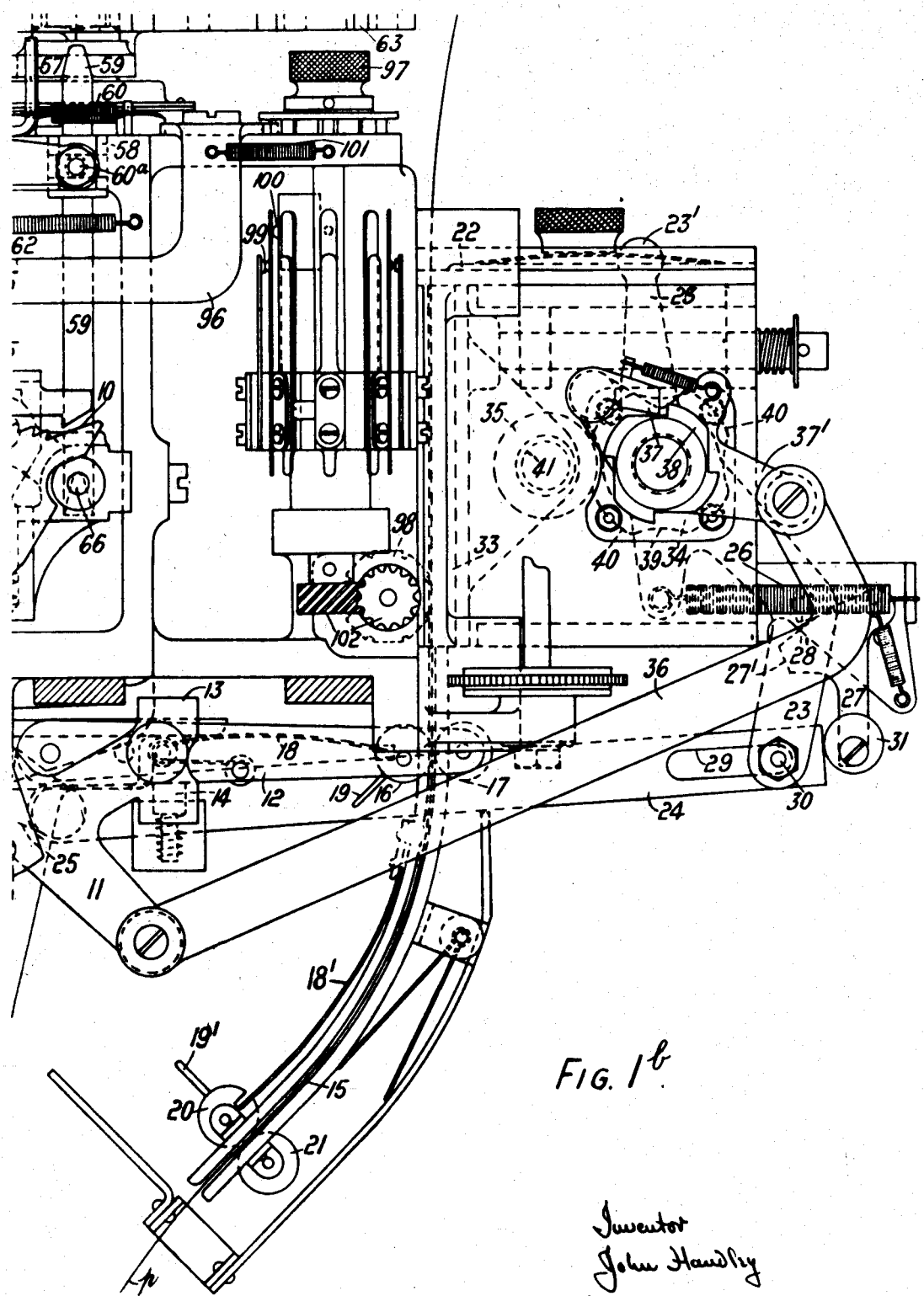
Fig. 1ᵇ.

TICKET PRINTING AND ISSUING MACHINE FOR TOTALIZATORS

Filed Aug. 29, 1936    9 Sheets-Sheet 4

Inventor
John Handley
By Pennie, Davis, Marvin Edmonds
Attorneys

April 25, 1939.  J. HANDLEY  2,155,655
TICKET PRINTING AND ISSUING MACHINE FOR TOTALIZATORS
Filed Aug. 29, 1936   9 Sheets-Sheet 6

April 25, 1939.  J. HANDLEY  2,155,655
TICKET PRINTING AND ISSUING MACHINE FOR TOTALIZATORS
Filed Aug. 29, 1936  9 Sheets-Sheet 9
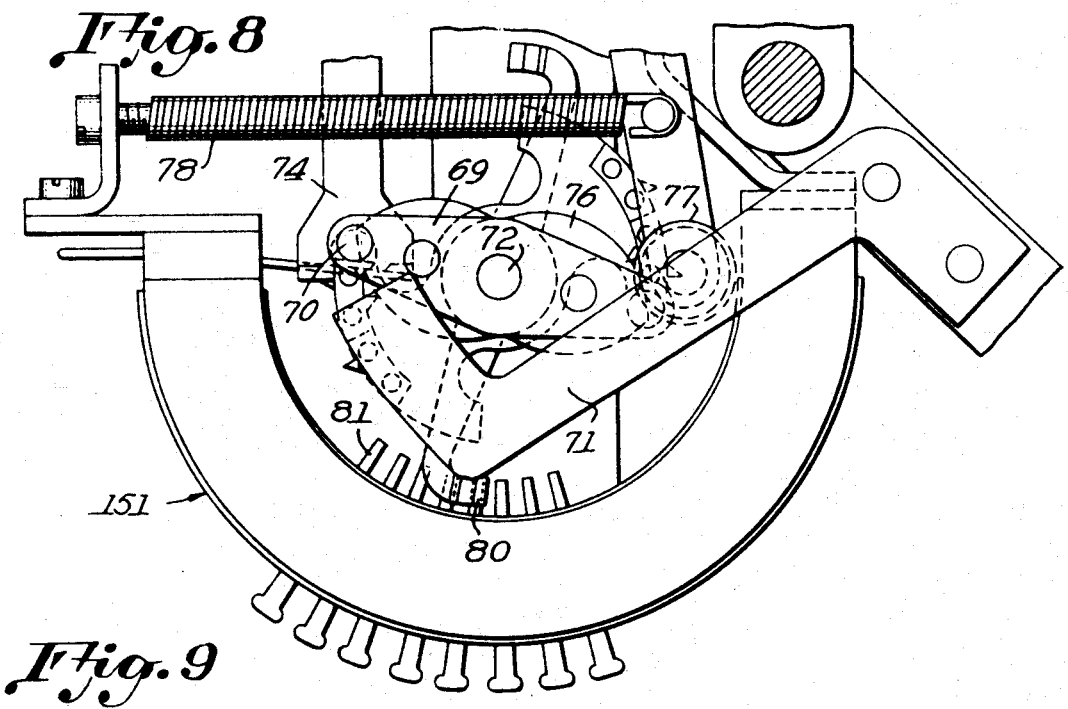
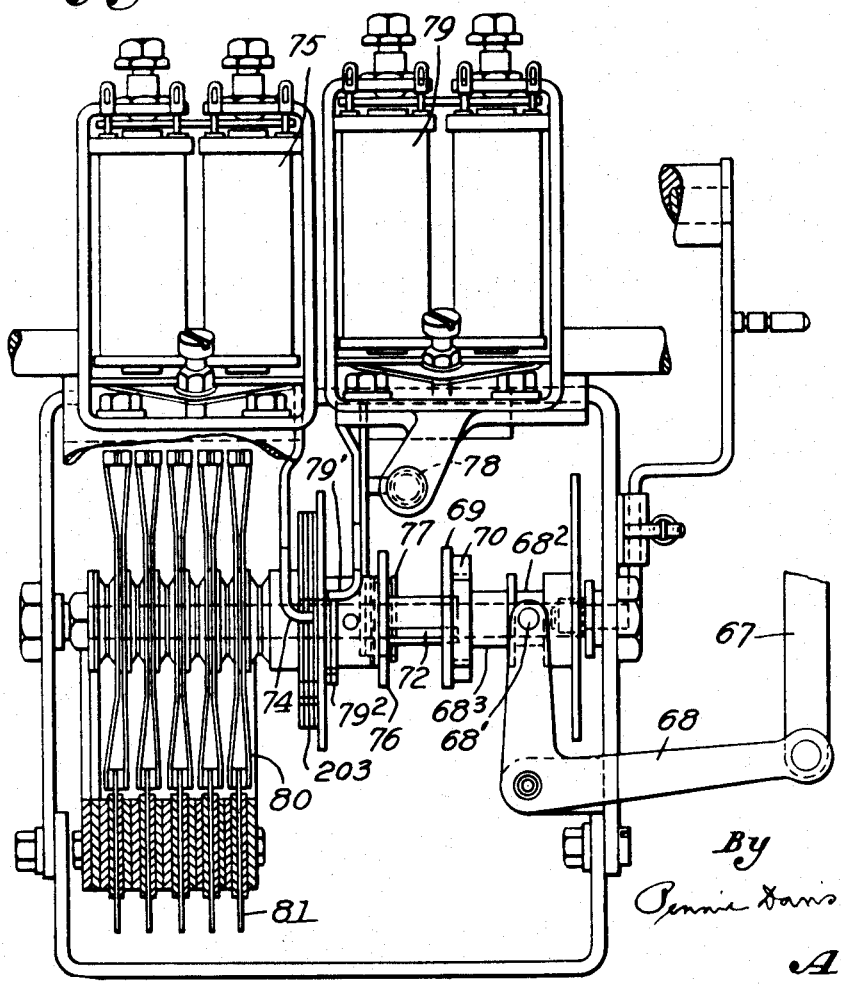
Inventor:
JOHN HANDLEY
By
Pennie Davis Marvin & Edmonds
Attorneys.

Patented Apr. 25, 1939

2,155,655

UNITED STATES PATENT OFFICE 2,155,655

TICKET PRINTING AND ISSUING MACHINE FOR TOTALIZATORS

John Handley, London, England

Application August 29, 1936, Serial No. 98,523
In Great Britain January 9, 1935

6 Claims. (Cl. 235—92)

The invention relates to improvements in ticket printing and issuing machines for totalizators.

A ticket printing and issuing machine according to the invention is provided with means to prevent a betting ticket being issued until a race number type has been positioned, so that a member associated with the race number type will make or break a circuit or circuits provided from a control station, whereby to ensure that betting tickets cannot be issued except when the race number type position corresponds with the position and condition provided, and as required by the control station.

Figure 1A:
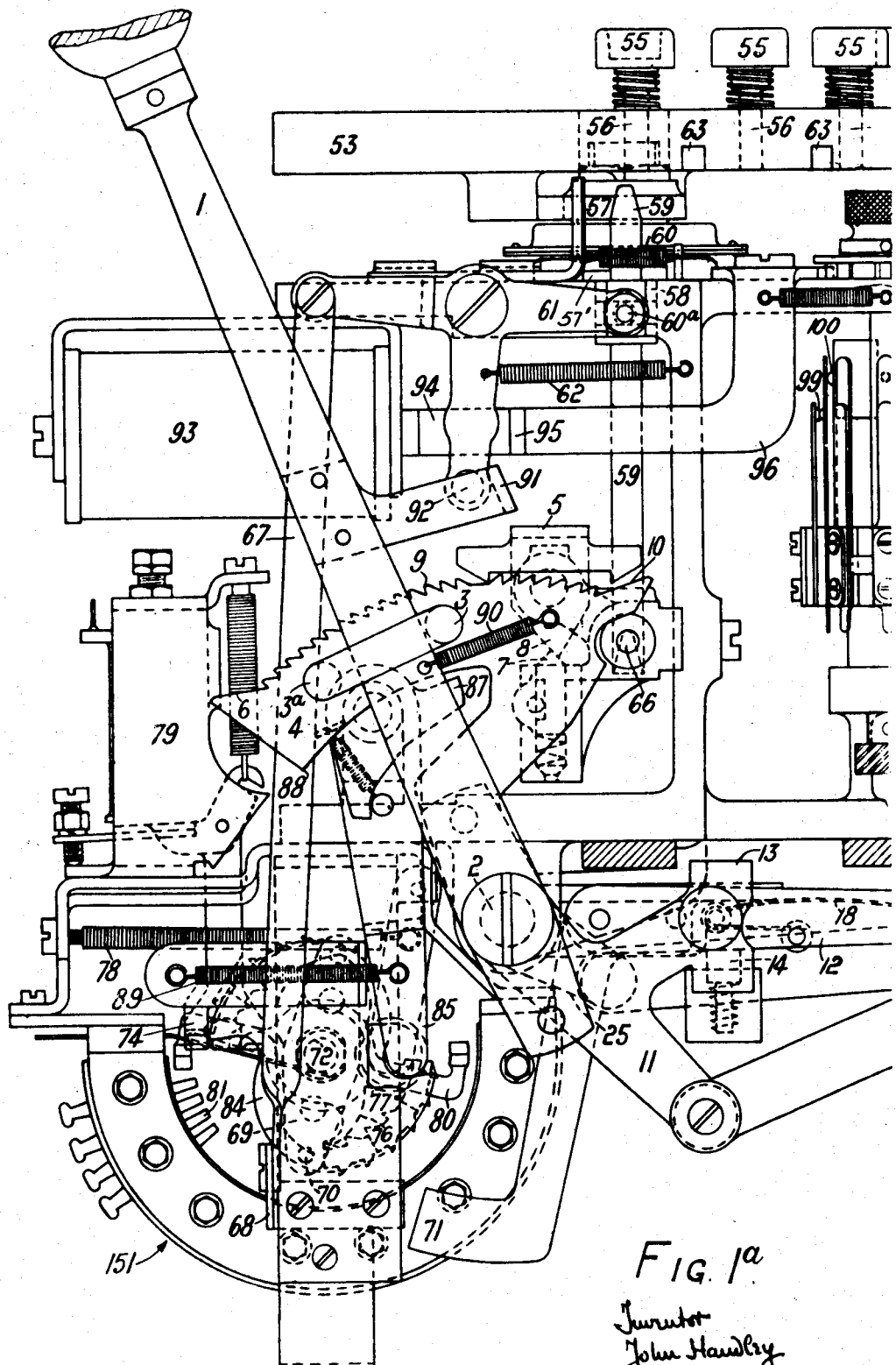
Figure 1C:
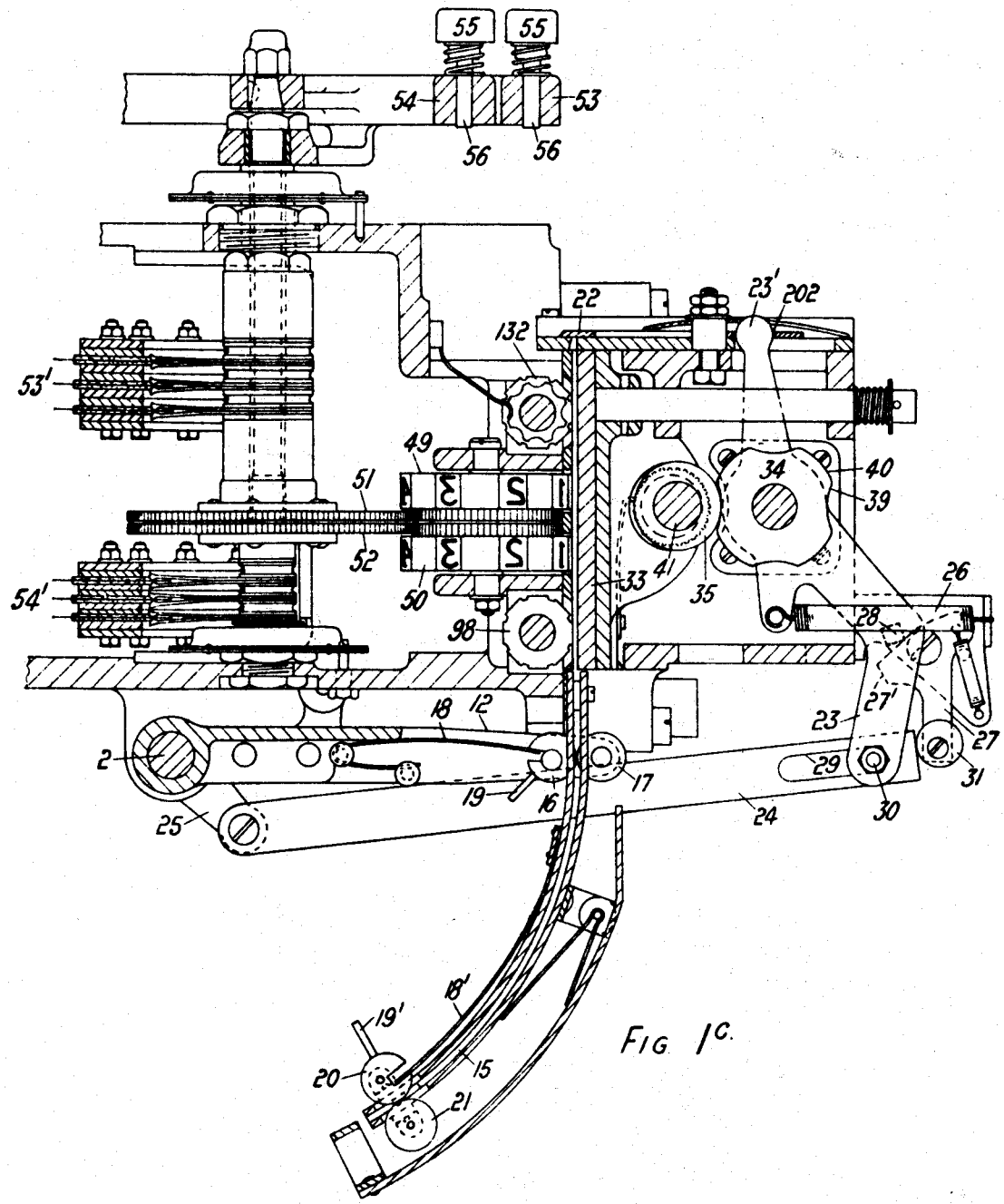
Figure 2:
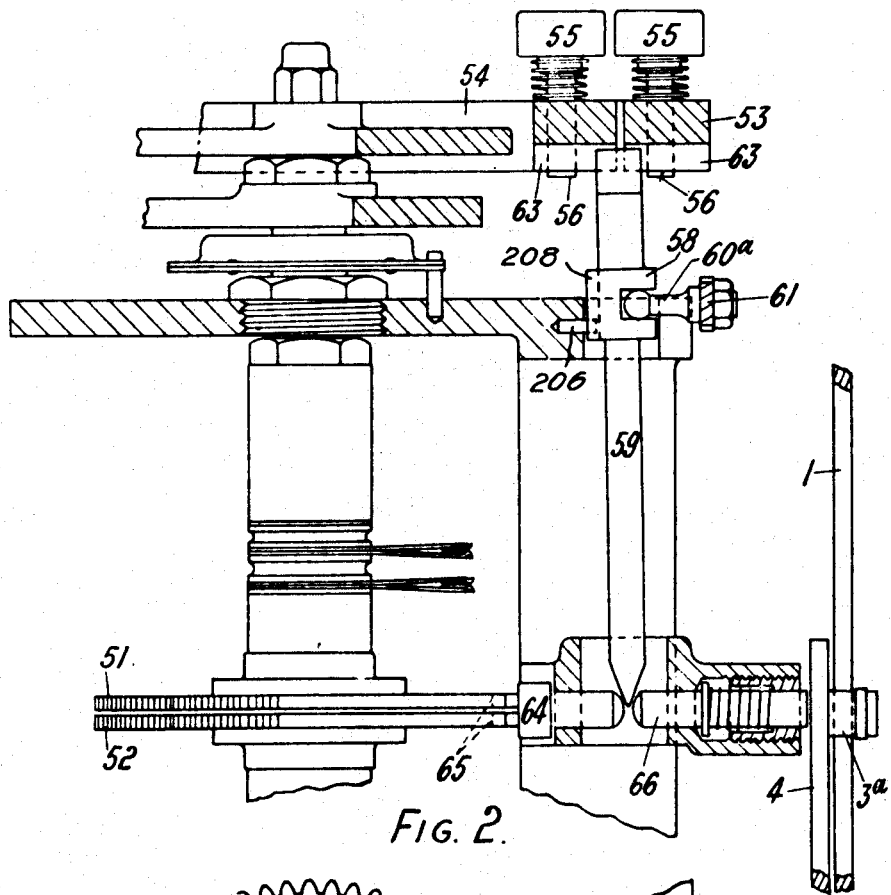
Figure 3:
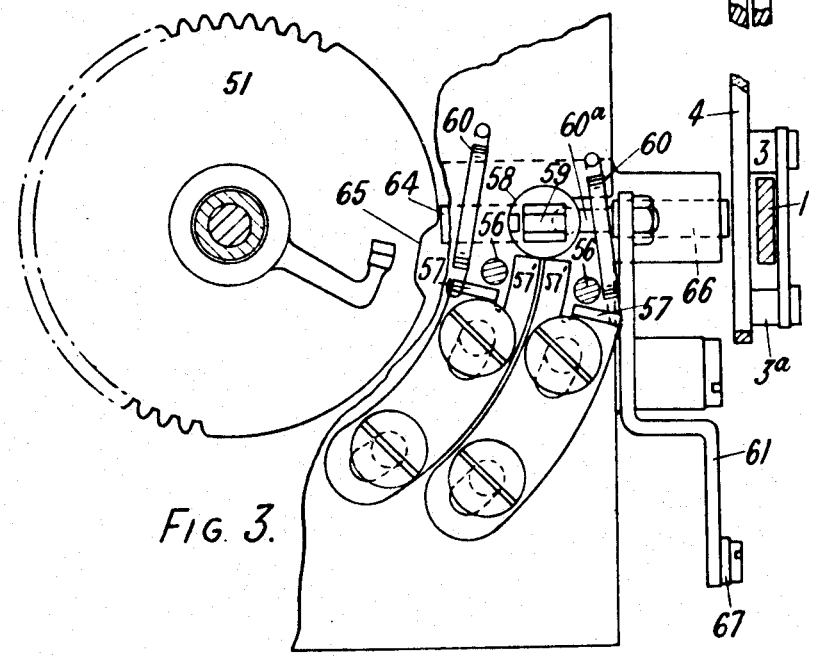
Figure 4:
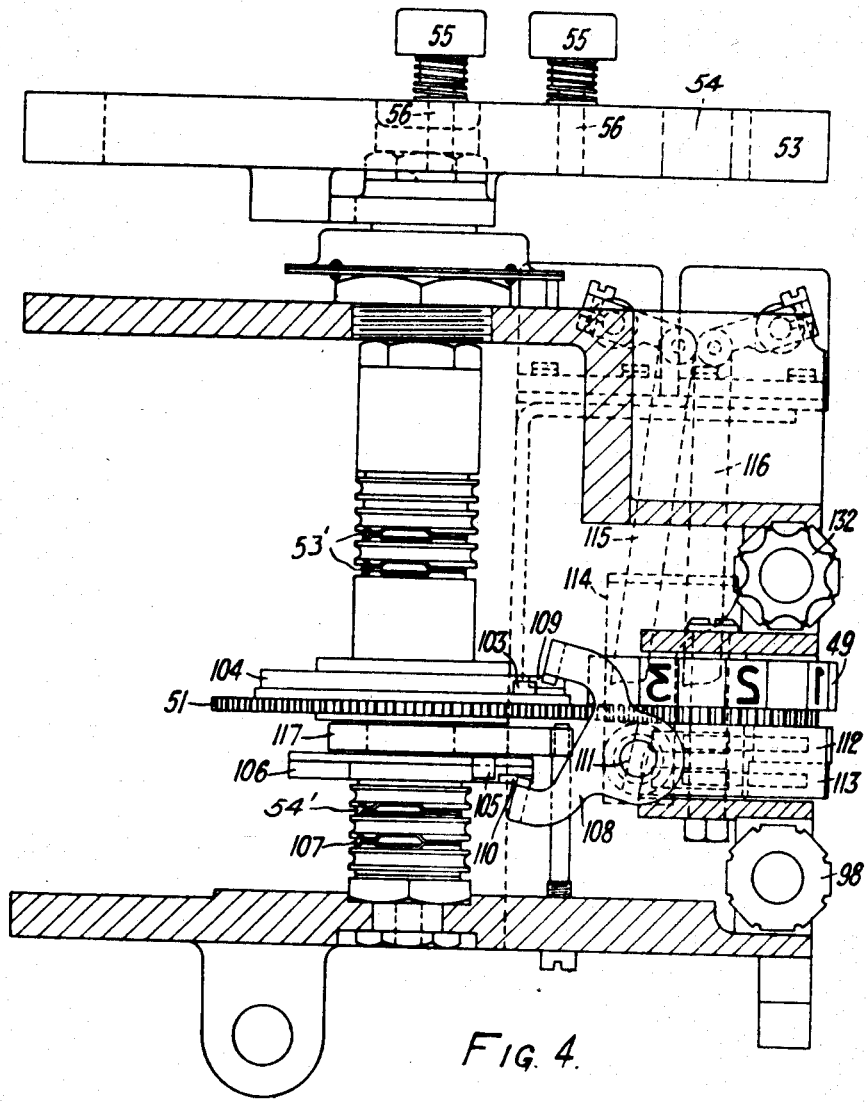
Figure 5:
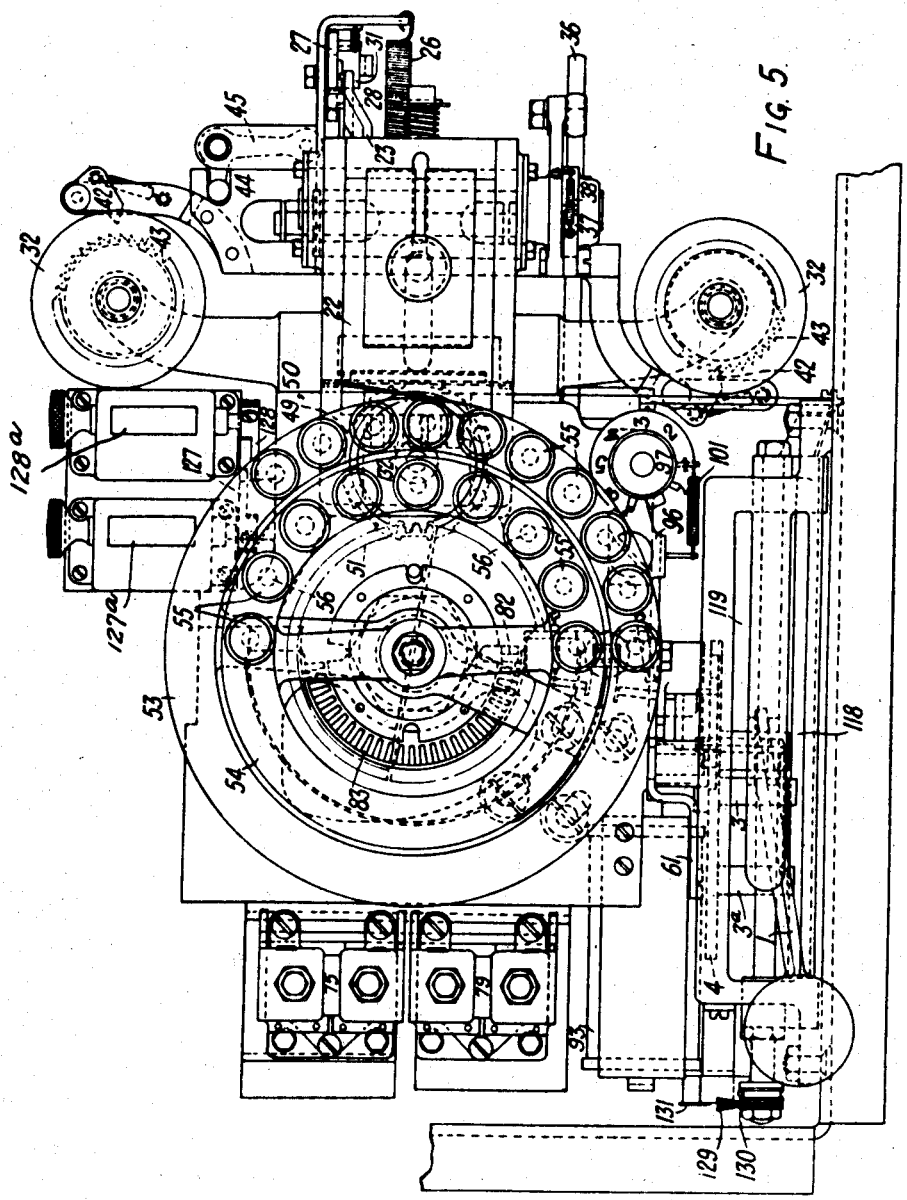
Figure 6:
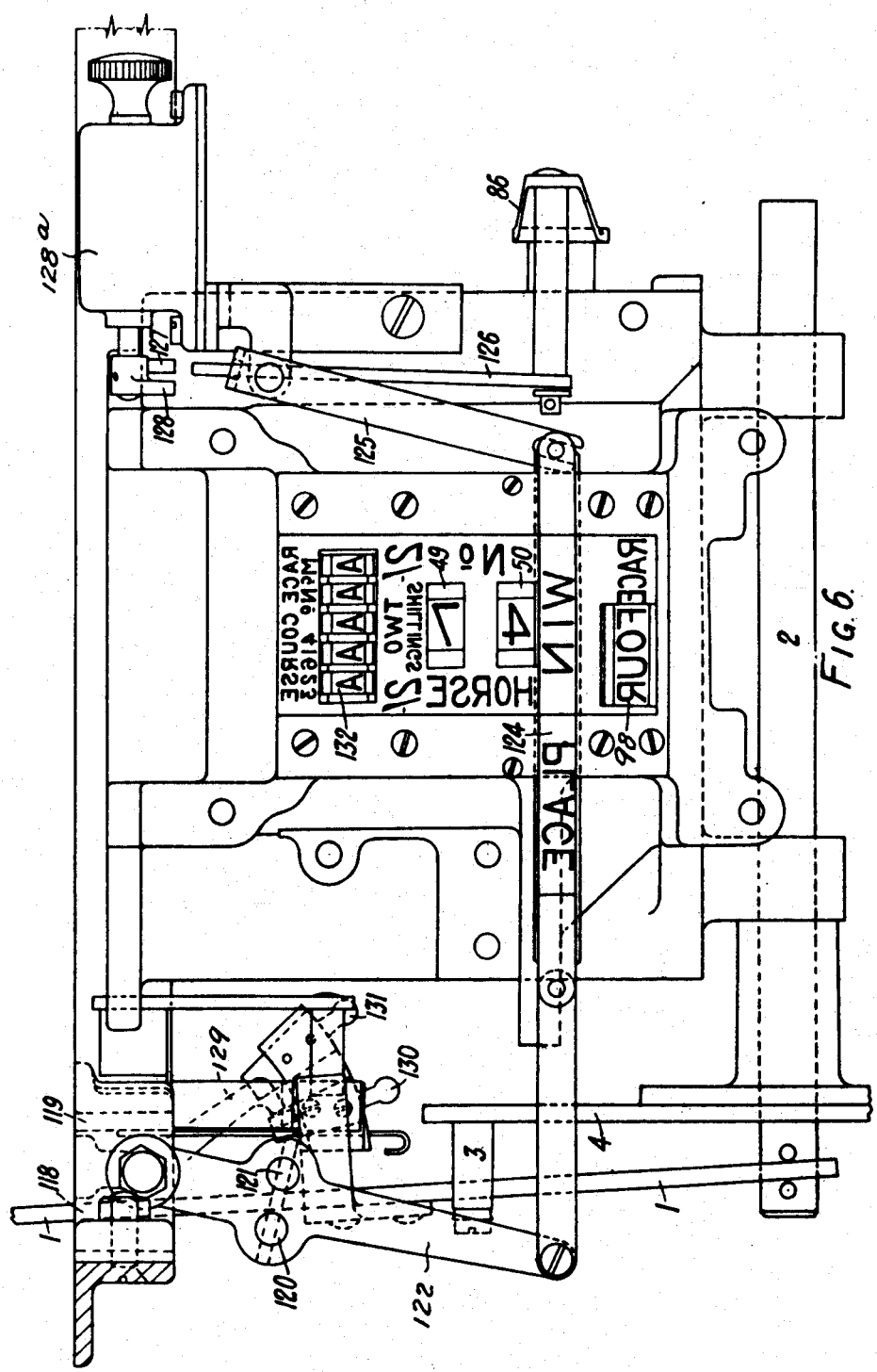
Figure 7:
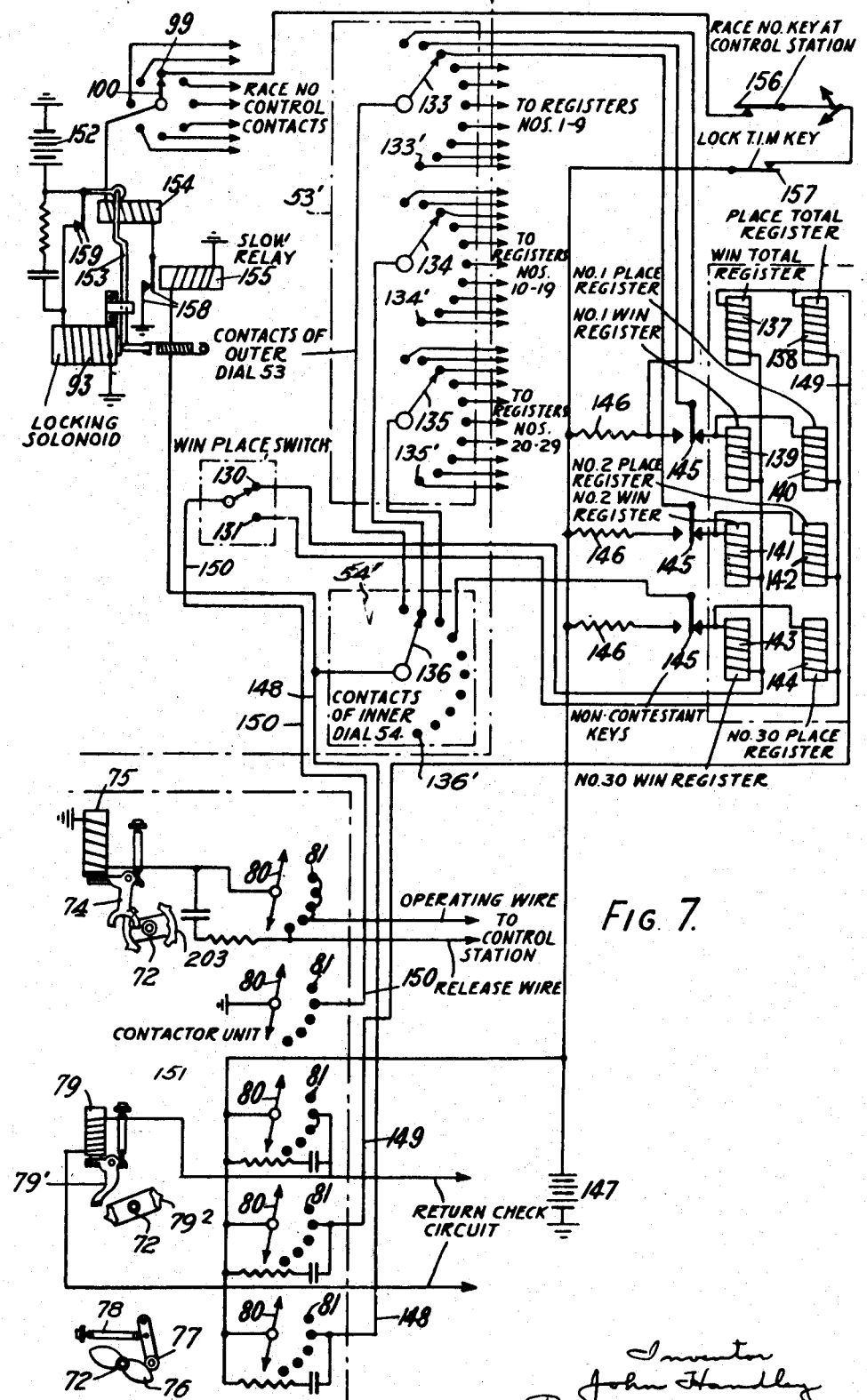

The invention is illustrated in the accompanying drawings in which Figs. 1a and 1b together constitute a side elevation of a machine with its casing and supporting frame removed. Fig. 1c is a longitudinal section on a plane parallel to the plane of Figs. 1a and 1b. Figs. 2 and 3 are a section and a plan, respectively, showing the locking mechanism of the machine. Fig. 4 is a fragmentary section of a modification including win-place type and ticket counter change-over mechanism. Fig. 5 is a plan view of the machine. Fig. 6 is an end elevation of the machine with the type exposed to show the type change-over mechanism, and also showing the ticket counter change-over mechanism and negative contacts from win or place registers. Fig. 7 is a circuit diagram for a thirty contestant race course machine. Fig. 8 is a view of the contactor unit of the machine drawn to a larger scale. Fig. 9 is a side view of the contactor unit.

Referring to the drawings, a manually operable printing lever 1 pivoted on a main shaft 2 is engageable alternately with each of two stops 3, 3ª mounted on a swinging rack 4. In the operation of the lever 1 to print and issue a ticket a pawl 5 engages the teeth 9 of the rack 4 in the forward stroke of the lever 1, so that the rack cannot be moved back until it has completed its forward stroke and until the pawl 5 has been rocked by a projection 6 on the rack and a spring loaded plunger 7 is engaging on the other side from that shown of an abutment 8 movable with the pawl 5. The lever 1 and the rack 4 are then free to return, a projection 10 on the rack restoring the pawl 5 and the abutment 8 to the position shown in Fig. 1a when the rack 4 has completed its return stroke. The lever 1 and associated parts are returned by a spring acting through an arm on the main shaft 2 at the remote side of the machine as viewed in Figs. 1a and 1b.

The rack 4 is secured on the main shaft 2 together with a bracket 11 which is engageable at 13, in each forward stroke of the lever 1, with one of two paper feed arms 12 disposed one on each side of a feeding strip p of ticket forming paper and adapted to perform conjoint swinging movement about the axis of the main shaft 2 under the action of the bracket 11. A spring-loaded plunger 14 is provided to allow the bracket 11 to continue its return travel to actuate a guillotine trip device after the feed arms 12 and therewith the paper strip p have come to rest.

The paper strip p travels up a guide 15 when gripped between a pair of rollers 16 and 17, each pair being carried by a feed arm 12. The roller 16 is eccentrically journalled, has a roughened surface, is urged in gripping direction by a spring 18, and may be rotated in releasing direction by manipulation of a pin 19 whereby to free the paper strip p. The rollers 16, 17 thus constitute a strip feeding device with a self-tightening grip. Retaining rollers 20 and 21 are provided at the lower end of the guide 15 to prevent the paper strip p slipping backwards, and a spring 18' and a release pin 19' are provided for these rollers also. When the feed arms 12 swing downwardly to the bottom of the guide 15, the rollers 16 and 17 slide over the paper strip p which is held by the rollers 20 and 21 and, when the arms 12 swing upwardly the paper strip p is pushed upwardly through the machine to be cut off by a guillotine blade 22. The strip-feeding device above described forms the subject of U. S. Patent No. 2,068,914.

The guillotine blade 22 is actuated from the lever 1 by an arm 25 secured on the shaft 2, and a link 24 connecting the arm 25 with the lower end of a lever 23 of which the upper end 23' penetrates a slot 202 in the blade 22 which is opened during the forward or printing stroke of the lever 1 when the feed arms 12 are moving downwardly. When the blade 22 is fully open a spring 26 is stretched by the lever 23 and the lever 23 is retained by a detent 27 presenting a face 27' which engages a stop 28 on the lever 23. The link 24 travels forwardly on the return movement of the lever 1 as the paper strip is fed and a slot 29 in the link 24 passes over a pin 30 in the lever 23 until the forward end of the link 24 engages an adjustable eccentric roller 31 on the detent 27 which releases the lever 23 whereupon the spring 26 actuates the blade 22 to cut off the printed ticket.

Printing is effected through a carbon ribbon carried on spools 32, (Fig. 5) and adapted to be squeezed between type and a platen 33 (Fig. 1b), by a cam 34 engageable with a roller 35 mounted in the platen. The cam 34 is rotated through 90° on each forward stroke of the printing lever 1 by a link 36, pawl-lever 37', pawl 37, and ratchet wheel 38. The cam 34 has four recesses 39 and four cam faces 40. The recesses 39 provide ample clearance between the platen 33 and the type for paper and ribbon feed whilst the cam faces 40 give intense pressure when the clearance has been taken up. The roller spindle 41 is eccentric and adjustable to vary the printing pressure. The roller 35 and the cam 34 run in anti-friction bearings.

The ribbon, stretched between the two rotary spools 32, is fed in either direction by one or other of two pawls 42 each engageable with a ratchet wheel 43. The pawls are mounted on a reciprocatory carrier 44 actuated by a bell crank 45 which is connected by a link 45' to the link 24. Two type wheels 49 and 50 are rotated to the required printing positions by gear sectors 51 and 52 actuated by dials 53 and 54 provided with plunger keys 55 which are numbered to correspond with units or tens, or with winners or seconds. These plunger keys 55 are selected as required, depressed by the fingers of the operator and the dials 53, 54 rotated in a clockwise direction until stopped by the engagement of the depressed key spindles 56 with trip plates 57 presenting tongues 57' which normally obstruct, as shown in Fig. 1a the boss 58 of a vertical plunger 59 which is pivotally mounted about its actuating pin 60a, pin 206 engaging a recess 208 in boss 58 of plunger 59. When engaged by the key spindles 56 the trip plates 57 are retracted against the action of springs 60, as shown in Fig. 3, whereby the tongues 57' release the plunger 59 which is lifted by a pin 60ᵃ on a control lever 61 urged by a spring 62, and locks both of the dials 53, 54 by engaging slots 63 in said dials as shown in Fig. 2. An inner plunger 64, which when the dials are in their zero or test ticket position engages in a recess 65 in the gear sectors 51, 52, is thrown outwards when the dials are rotated (Figs. 2 and 3) and displaces an outer plunger 66 outwardly, the lower end of the plunger 59 being withdrawn from between the plungers 64 and 66 when the plunger 59 ascends. The lower end of the plunger 59 is wedge shaped and, when withdrawn from between the plungers 64 and 66, permits the plunger 66 to move inwardly by spring effort out of the path of the rack 4, thus permitting operation of the printing lever 1.

When the printing lever 1 is operated it entrains the rack 4 with it and, until the rack is restored to normal position, it is impossible to release the dials 53, 54 by reason of the fact that the rack obstructs outward displacement of the plunger 66 so that the plunger 59 cannot be depressed until the plunger 66 is freed by restoration of the rack to normal position, it being understood that depression of the plunger 59 is prevented so long as the plunger 66 is held against outward displacement, such outward displacement of the plunger 66 permitting passage between the plungers 64, 66 of the wedge-shaped lower end of the plunger 59.

For the purpose of transmitting counting impulses to registers of which the actuating electromagnets are indicated at 137–144 (Fig. 7), there is provided a contactor unit 151 (Figs. 1a, 7, 8 and 9) which is actuated from the controlled lever 61 through a link 67 and a cranked lever 68. As shown in Fig. 9, the cranked lever 68 is provided with a pin 68' which engages an annular recess 68² in a tubular shaft 68³. Said shaft is unitary with the plate 69 and is slidable therewith upon the spindle 72, the arrangement being such that rocking movement of the lever 68 causes axial displacement of the shaft 68³ and the plate 69. When the plunger 59 rises to lock the dials 53 and 54, the lever 68 slides the plate 69, rotatable with the contactor rotor spindle 72, into an operative position so that the pin 70 on the plate 69 is engageable by a lever 71 (Fig. 8) operable by the printing lever 1 (Fig. 1a). When, now, the printing lever 1 is actuated to print a ticket the contactor rotor spindle 72 is rotated by the lever 71 until a tooth on an escapement device 203 (Fig. 7) is checked by the armature 74 of a magnet 75.

While the spindle 72 is being rotated a cam 76 lifts a roller 77 and stretches a spring 78 until the roller 77 has passed over the peak of the cam when the spring 78 causes the spindle 72 to continue a cycle of 180° rotation under the control of the magnet 75 of which the armature 74 releases the escapement in steps as contactor-releasing impulses are produced by a rotary assignor switch located at a control station, it being understood that a ticket printing and issuing machine has access to the registers only for a predetermined interval of time during which other ticket printing and issuing machines are precluded from access to the registers. As these impulses are received brushes 80 engaging contacts 81 send counting impulses to the registers through the medium of selector switches 53', 54' controlled by the rotary movements of the dials 53, 54, respectively.

Another cam 84 on the spindle 72 of the contactor unit cooperates with an arm 85 whereby to actuate a ticket counter 127a or 128a through the medium of an arm 86 and a push rod 126 (Figs. 5 and 6).

The arm 85 at the same time allows a pawl 87 to lift so that it arrests the rack 4 at point 88 making it impossible for the printing lever 1 to return until the contactor unit has completed its cycle, allowing the arm 85 to return urged by a spring 89.

As the printing lever 1 returns and a ticket is issued the rack 4 is retained by the pawl 5 and the lever 1 continues to move, stretching a spring 90, until stopped by the stop 3ᵃ. During this continued movement of the lever 1 a catch 91 on the lever 1 strikes a pin 92 on the control lever 61 and this action withdraws the plunger 59 and allows the trip plates 57 to return and to retain the plunger 59, allowing the dials 53, 54 to return to zero under spring action. When a test ticket is required the printing lever 1 is operated with the dials at zero so that the inner plunger 64 is resting in the recess 65 in the gear sectors 51 and 52 and the plunger 59 is not lifted and, therefore, the contactor unit is not affected to actuate either the ticket counter or the registers.

If a race number control knob 97 is not in its prescribed setting, or if a non-contestant is dialled, a locking solenoid 93 is energised to actuate a plunger 94 which engages the control lever 61 by a boss 95, preventing the plunger 59 from rising so that the machine cannot be set up.

A locking bar 96 is also withdrawn from teeth of the race number control knob 97 so that a type roller 98 may be rotated through spiral gears 102 by turning the knob 97.

Contacts 99 (Figs. 1b and 7) are closed in turn by an insulated peg 100 which rotates with the knob 97, and a circuit from the control station via any of these contacts is taken to a relay so that the circuit to the solenoid 93 may be broken at 159 (Fig. 7) only when the correct pair of contacts 99 are "made", when the solenoid plunger will return urged by a spring 101, and the locking bar 96 will re-engage the race number control knob 97.

For win and place betting, in addition to positioning the contestant number type, win type or place type are brought into printing position alternately and mechanism is provided to cause the win ticket counter 127a or the place ticket counter 128a to operate when corresponding tickets are printed.

Fig. 4 shows a section of a modification including win place ticket mechanism, suitable for not more than 9 contestants. Only one type wheel 49 is used, actuated by a gear sector 51 which is rotated from either of the two dials 53, 54, the outer dial 53 operating the sector 51 by engaging a pin 103 by a cam disc 104 when selecting to issue a win ticket; an inner dial engaging pin 105 is engageable by a cam disc 106 when selecting to issue a place ticket.

The selector switch 53' is wired to win registers, and the selector switch 54' is wired to place registers. Brushes 107 are fed from separate wires for non-contestants and these actuate another relay to energise the locking solenoid 93 when a non-contestant is dialled. A spring 117 returns either of the dials to zero.

A fork 108 is actuated by either of the cam discs. When the win cam disc 104 is rotated and the fork lifted by a bevelled cam edge 109, the other end of the fork prevents the place cam disc 106 from rotating by rising in front of a bevelled cam edge 110. In the same way, when the place dial is operated the fork is dropped, preventing the win dial from moving.

The fork spindle 111 is cut away to form a double cam which thrusts forward a win type block 112 when lifted, and a place type block 113, when dropped.

A bracket 114 carried on the spindle 111 forms a guide for ticket counter push rods 115 and 116. 115 is the win counter push rod and 116 is the place counter push rod and these are actuated, when a win or place ticket is printed, by an arm 86 (see Fig. 6) when the contactor unit is actuated by the lever 71 (see Fig. 1a).

The win-place type movement and counter change over are actuated by the printing lever 1 when it is moved laterally to operate in one or other of guide slots 118, 119, the lateral setting of the lever 1 determining whether the counter 127a is operated to register a win ticket, or whether the counter 128a is operated to register a place ticket.

The printing handle 1 also moves between rods 120 and 121 in a lever 122 linked to a type bar 124 which also controls a guide 125 to position the push rod 126 to strike a ticket counter arm 127 for a win ticket, or an arm 128 for a place ticket, when operated by the arm 86.

A pair of brushes 129 (Figs. 5 and 6) are moved from contact 130 to contact 131, when a type change takes place, to control the negative circuit from the registers.

Rotatable discs of type 132 are provided to print the race code and these are accessible when the cover plate is removed to zeroise the ticket counters before each race meeting.

Fig. 7 shows a circuit diagram for a 30 contestant racecourse machine. 133, 134 and 135 are the brushes, and 133', 134' and 135' the contacts, of the selector switch 53' of the outer selector dial 53. The contacts of 133' are wired to registers Nos. 1–9, 0 being permanently wired to a battery as a non-contestant. The contacts 134' control registers Nos. 10–19, and the contacts 135' control registers Nos. 20–29. 136 and 136' denote the brushes and the contacts of the selector switch 54' of the inner selector dial 54 which selects the tens printing type. The first stud of these contacts 136' is wired to the collector ring of the brush 133, the second stud to 134, the third stud to 135, and the fourth stud direct to No. 30 register. According to Fig. 7 the machine is set up on No. 23 contestant.

With particular reference to Fig. 7, when the machine is operated the brushes 80 are advanced towards contacts 81 and, when impulses are received from the assignor switch by the magnet 75, the brushes 80 are stepped on to the contacts 81, and a battery 147 feeds positive to a win total register 137, and a place total register 138 via a line 149, and to the selected contestant registers via a line 148.

139, 141 and 143 are Nos. 1, 2 and 30 win registers, respectively, and 140, 142, and 144, are Nos. 1, 2 and 30, place registers, respectively. The negative sides of all win registers are taken to the contact 130 on the win-place switch, and the negative sides of all place registers are taken to the contact 131, the switch arm of the contacts 130, 131 being earthed by the line 150 and the contactor units contacts, as the controlling unit operates.

A return check circuit feeds the magnet 79 as a bet is accepted, and if this does not come through, an armature 79' associated with the magnet 79 cooperating with an escapement device 79² retains the contactor unit so that the ticket cannot be issued.

Non-contestant keys 145 put the battery 147 via a resistance 146 on to the common counting wires and disconnect them from their registers. Then, if a non-contestant is dialled, the battery 147 will energise a slow-operating relay 155 (that would not be affected by a short counting impulse) which will break the circuit at 158 provided from the battery 147 via a lock ticket-issuing machine key 157, race number key 156 at the control station, and the race control contacts 99, by separating the contacts 158. This will restore the relay 154 and make the contacts 159 allowing the battery 152 to energise the locking solenoid 93 so that the machine will not set up. A retaining bar 153 may be operated by the armature of the relay 154 so that the solenoid plunger will not be released if the battery 152 is disconnected, unless the relay 154 is energised. Thus, if the machines are to be locked for long periods, the battery 152 will not be discharged by the solenoid 93.

Features of the machine described and illustrated form also the subject of our copending applications Serial Nos. 98,522, filed August 29, 1936, and of Patent No. 2,068,914 and Patent No. 2,111,927.

I claim:

1. A ticket printing and issuing machine for use with a totalizator, comprising an operating lever for controlling the issuance of tickets by said ticket-issuing machine, a contactor unit and a manually settable control member, a selector switch operable conjointly with the control member, a relay controlled by said selector switch, and electro-magnetic locking means controlled by said relay, said operating lever and said contactor unit being locked against operation by said electro-magnetic locking means except when the control member is in a prescribed setting.

2. A ticket printing and issuing machine as claimed in claim 1, including a retaining catch actuated by the relay and adapted to hold the locking means in locked position after said means has been de-energised, and not to release the locking means until the relay is operated.

3. A ticket printing and issuing machine as claimed in claim 1 including means actuated by the electro-magnet and adapted to lock the type-presenting member in set position when the machine is free to issue tickets, and to unlock said member when the machine is locked.

4. In a totalizer system, a register, a contactor unit for transmitting electric impulses to the register to actuate the same, a ticket-issuing machine, and a lever for controlling the issuance of tickets by said ticket-issuing machine, a movable rack to control the movement of said lever, a pawl to control the movement of said rack, an arm to actuate said pawl, said contactor unit controlling the movement of said arm, whereby the contactor unit controls the actuation of said lever to issue a ticket until each impulse transmitted by said contactor unit to said register has been registered.

5. In a totalizing system, a register, a contactor unit for transmitting electric impulses to the register to actuate the same, means in the register to effect revertive impulses upon failure of electric impulses transmitted to the register to actuate the same, said contactor unit including a rotatable element, electro-magnetic means energized by said revertive impulses and an escapement mechanism cooperating with said electro-magnetic means to control movement of said rotatable element, a movable rack, means to control the movement of said rack, means mounted on the rotatable element of the contactor unit and cooperating with the aforesaid means to control the movement of said rack, a ticket-issuing machine, an operating lever for controlling the issuance of tickets by said ticket-issuing machine, the operation of said lever to issue a ticket being controlled by the movable rack, whereby said electro-magnetic means and said escapement mechanism cooperate and through said contactor unit prevent actuation of said lever to issue a ticket until each impulse transmitted by the contactor unit to said register has been registered.

6. In a totalizing system, a register, a contactor unit for transmitting electric impulses to the register to actuate the same, means in the register to effect revertive impulses upon failure of electric impulses transmitted to the register to actuate the same, said contactor unit including a spindle, electro-magnetic means energized by said revertive impulses, and an escapement mechanism cooperating with said electro-magnetic means to control movement of said spindle, a movable rack, a pawl to control the movement of said rack, an arm to control the operation of said pawl, a cam mounted on the spindle of the contactor unit, said cam cooperating with the arm to lift the pawl, a ticket-issuing machine, an operating lever for controlling the issuance of tickets by said ticket-issuing machine, the operation of said lever to issue a ticket being controlled by the movable rack, whereby said electro-magnetic means and said escapement mechanism cooperate and through said contactor unit prevent actuation of said lever to issue a ticket until each impulse transmitted by the contactor unit to said register has been registered.

JOHN HANDLEY.